United States Patent
Vermani et al.

(10) Patent No.: US 9,692,123 B2
(45) Date of Patent: Jun. 27, 2017

(54) SYSTEMS AND METHODS OF CONTROLLING ANTENNA RADIATION PATTERNS

(71) Applicant: QUALCOMM Incorporated, San Diego, CA (US)

(72) Inventors: Sameer Vermani, San Diego, CA (US); Didier Johannes Richard Van Nee, Tull en 't Waal (NL); Sanaz Barghi, San Diego, CA (US); Hemanth Sampath, San Diego, CA (US); Vincent Knowles Jones, IV, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 927 days.

(21) Appl. No.: 14/024,520

(22) Filed: Sep. 11, 2013

(65) Prior Publication Data

US 2014/0077997 A1 Mar. 20, 2014

Related U.S. Application Data

(60) Provisional application No. 61/702,129, filed on Sep. 17, 2012.

(51) Int. Cl.
| | |
|---|---|
| *H04B 7/02* | (2017.01) |
| *H01Q 3/24* | (2006.01) |
| *H04B 7/0408* | (2017.01) |
| *H04B 7/0426* | (2017.01) |

(Continued)

(52) U.S. Cl.
CPC .............. *H01Q 3/24* (2013.01); *H01Q 3/26* (2013.01); *H04B 7/02* (2013.01); *H04B 7/0408* (2013.01); *H04B 7/0426* (2013.01); *H04B 7/068* (2013.01); *H04B 7/0613* (2013.01);

(Continued)

(58) Field of Classification Search
CPC . H01Q 3/24; H01Q 3/26; H04L 1/02–1/0631; H04B 7/02; H04B 7/0408; H04B 7/0413; H04B 7/0426; H04B 7/0456; H04B 7/0491; H04B 7/0495; H04B 7/0667; H04B 7/0669; H04B 7/0671; H04B 7/068; H04B 7/0682; H04B 7/0691; H04B 7/0693; H04B 7/0695; H04B 7/0697
USPC ............... 342/360, 368, 374; 370/294, 295; 375/259, 260, 295, 299, 316
See application file for complete search history.

(56) References Cited

U.S. PATENT DOCUMENTS

| | | | | |
|---|---|---|---|---|
| 7,236,807 B1* | 6/2007 | Shapira | .................. | H01Q 1/246 342/372 |
| 7,551,611 B2* | 6/2009 | Nakao | .................. | H04B 7/0413 370/358 |

(Continued)

*Primary Examiner* — Peter Bythrow
(74) *Attorney, Agent, or Firm* — Knobbe, Martens, Olson & Bear

(57) ABSTRACT

In a particular embodiment, a method of controlling a radiation pattern includes selecting a signal processing characteristic to vary based on a radiation pattern to be emitted by an antenna array of a wireless device, wherein the antenna array includes a plurality of antennas, wherein the signal processing characteristic provides a target resultant radiation pattern, and wherein the signal processing characteristic is applies to less than all elements of the antenna array, and varying the signal processing characteristic across time, frequency, or a combination thereof.

44 Claims, 7 Drawing Sheets

(51) Int. Cl.
    *H01Q 3/26* (2006.01)
    *H04B 7/06* (2006.01)

(52) U.S. Cl.
    CPC .......... *H04B 7/0669* (2013.01); *H04B 7/0671* (2013.01); *H04B 7/0682* (2013.01)

(56) References Cited

U.S. PATENT DOCUMENTS

| | | | | |
|---|---|---|---|---|
| 7,715,877 B2* | 5/2010 | Nakao | .................. | H04B 7/0619 375/260 |
| 7,865,153 B2* | 1/2011 | Khan | .................. | H04B 7/0617 455/101 |
| 8,310,402 B2 | 11/2012 | Yang | | |
| 2005/0180360 A1* | 8/2005 | Hansen | ................ | H04B 7/0667 370/334 |
| 2005/0254592 A1* | 11/2005 | Naguib | ................ | H04B 7/0417 375/267 |
| 2006/0030364 A1* | 2/2006 | Olesen | ................ | H04B 7/0617 455/562.1 |
| 2006/0068698 A1* | 3/2006 | Sandhu | ................ | H04B 7/0671 455/1 |
| 2006/0146692 A1* | 7/2006 | Gorokhov | ................ | H04B 7/04 370/208 |
| 2007/0046539 A1* | 3/2007 | Mani | ........................ | H01Q 3/26 342/383 |
| 2007/0097856 A1* | 5/2007 | Wang | .................. | H04B 7/0417 370/210 |
| 2008/0039030 A1* | 2/2008 | Khan | .................. | H04B 7/0617 455/101 |
| 2008/0205533 A1* | 8/2008 | Lee | ...................... | H04B 7/0671 375/260 |
| 2009/0103593 A1* | 4/2009 | Bergamo | ............... | H04B 1/707 375/146 |
| 2010/0061477 A1* | 3/2010 | Lee | ...................... | H04L 1/1893 375/267 |
| 2010/0066635 A1* | 3/2010 | Lindgren | .................. | H01Q 1/523 343/893 |
| 2011/0064157 A1* | 3/2011 | Erlich | .................. | H04B 7/0671 375/267 |
| 2011/0199992 A1* | 8/2011 | Barker | .................. | H01Q 1/246 370/329 |
| 2011/0210892 A1* | 9/2011 | Shany | ...................... | H01Q 3/26 342/373 |
| 2012/0236961 A1* | 9/2012 | Lee | ...................... | H04B 7/028 375/295 |
| 2012/0294185 A1* | 11/2012 | Queseth | ............. | H04W 74/008 370/252 |
| 2013/0272147 A1* | 10/2013 | Vermani | ............... | H04B 7/0891 370/252 |

* cited by examiner

Two-Antenna Array

Three-Antenna Array

SYSTEMS AND METHODS OF CONTROLLING ANTENNA RADIATION PATTERNS

CROSS-REFERENCE TO RELATED APPLICATIONS

The present application claims priority to provisional U.S. Application Ser. No. 61/702,129, entitled "SYSTEMS AND METHODS OF ANTENNA ADJUSTING RADIATION PATTERN," filed Sep. 17, 2012, assigned to the assignee hereof and incorporated herein by reference in its entirety.

FIELD

The present disclosure is generally related to systems and methods of controlling antenna radiation patterns.

BACKGROUND

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones incorporate other types of devices, e.g., a wireless telephone can also include a digital still camera, a digital video camera, a digital recorder, and an audio file player. Such wireless telephones can process executable instructions, including software applications, such as a web browser application, that can be used to access the Internet. As such, these wireless telephones can include significant computing capabilities.

An equivalent isotropic radiation power (EIRP) value refers to a highest signal strength measured in any direction from a transmitter device (e.g., a transmitter integrated into a wireless telephone). In jurisdictions that have EIRP limitations imposed by regulatory bodies (e.g., the Federal Communications Commission (FCC) in the United States), wireless devices (e.g., a transmitter device) are required to comply with EIRP limitations when transmitting via a single antenna or multiple antennas. For example, a transmitter device operating in the 6-9 gigahertz (GHz) frequency band (e.g., an ultra-wide band (UWB)) must adhere to stringent EIRP limitations. To comply with the EIRP limitations in the United States, a transmitter device operating in the 6-9 GHz frequency band may be required to have a power spectral density less than −14 dBm (an abbreviation of a power ratio in decibels (dB) of a measured power referenced to one milliwatt (mW)) in a 500 megahertz (MHz) bandwidth in a frequency band of interest (e.g., the 6-9 GHz frequency band).

An EIRP value is associated with a product of an input power to an antenna of the transmitter device and an antenna radiation pattern associated with the antenna. The EIRP value may be an average EIRP across multiple symbols over a time period (e.g., one millisecond in the United States) that is determined based on a measured signal strength in all directions from the transmitter device (e.g., a wireless device). In the United States, the EIRP value of the transmitter device is an average value of the signal strength measured over one millisecond. The average EIRP may be referred to as an EIRP pattern which is representative of a measured radiation pattern of a multi-antenna transmission. For example, the transmitter device may be tested in accordance with procedures specified in Part 15.31(a) and 15.523 of FCC rules. When the average EIRP value in any direction is determined to be above an EIRP limit, a power level of the transmitter device must be reduced by an amount that the average EIRP value was over the limit. The average EIRP value may be measured for a particular bandwidth (BW) (e.g., an EIRP BW) that corresponds to a particular EIRP limit. For example, when the antenna radiation pattern (of a single antenna or of an antenna array) is not spatially flat (e.g., spatially smooth), a peak antenna gain in a single direction (that is in excess of the EIRP limit) causes a reduction of transmit power in all directions.

SUMMARY

Systems and methods of controlling radiation patterns (e.g., to "spatially flatten" the radiation pattern of an antenna or antenna array) are described. For example, a signal processing characteristic may be selected to vary based on a radiation pattern to be emitted by an antenna array of a wireless device, wherein the antenna array includes a plurality of antennas, wherein the signal processing characteristic provides a target resultant radiation pattern, and wherein the signal processing characteristic is applied to less than all elements of the antenna array. The signal processing characteristic may then be varied across time, frequency, or a combination thereof.

In a particular embodiment, an apparatus is configured to control a radiation pattern, comprising a processor to select a signal processing characteristic to vary based on a radiation pattern to be emitted by an antenna array of a wireless device, wherein the antenna array includes a plurality of antennas, wherein the signal processing characteristic provides a target resultant radiation pattern, and wherein the signal processing characteristic is applied to less than all elements of the antenna array. The processor is further configured to vary the signal processing characteristic across time, frequency, or a combination thereof.

In another particular embodiment, an apparatus for controlling a radiation pattern comprises first means for selecting a signal processing characteristic to vary based on a radiation pattern to be emitted by an antenna array of a wireless device, wherein the antenna array includes a plurality of antennas, wherein the signal processing characteristic provides a target resultant radiation pattern, and wherein the signal processing characteristic is applies to less than all elements of the antenna array; and means for varying the signal processing characteristic across time, frequency, or a combination thereof.

In another particular embodiment, a non-transitory computer-readable medium comprises code that, when executed, causes an apparatus to select a signal processing characteristic to vary based on a radiation pattern to be emitted by an antenna array of a wireless device, wherein the antenna array includes a plurality of antennas, wherein the signal processing characteristic provides a target resultant radiation pattern, and wherein the signal processing characteristic is applies to less than all elements of the antenna array; and to vary the signal processing characteristic across time, frequency, or a combination thereof.

Other aspects, advantages, and features of the present disclosure will become apparent after review of the entire application.

DETAILED DESCRIPTION

Particular embodiments of the present disclosure are described below with reference to the drawings. In the description, common features are designated by common reference numbers throughout the drawings.

Figure 1:
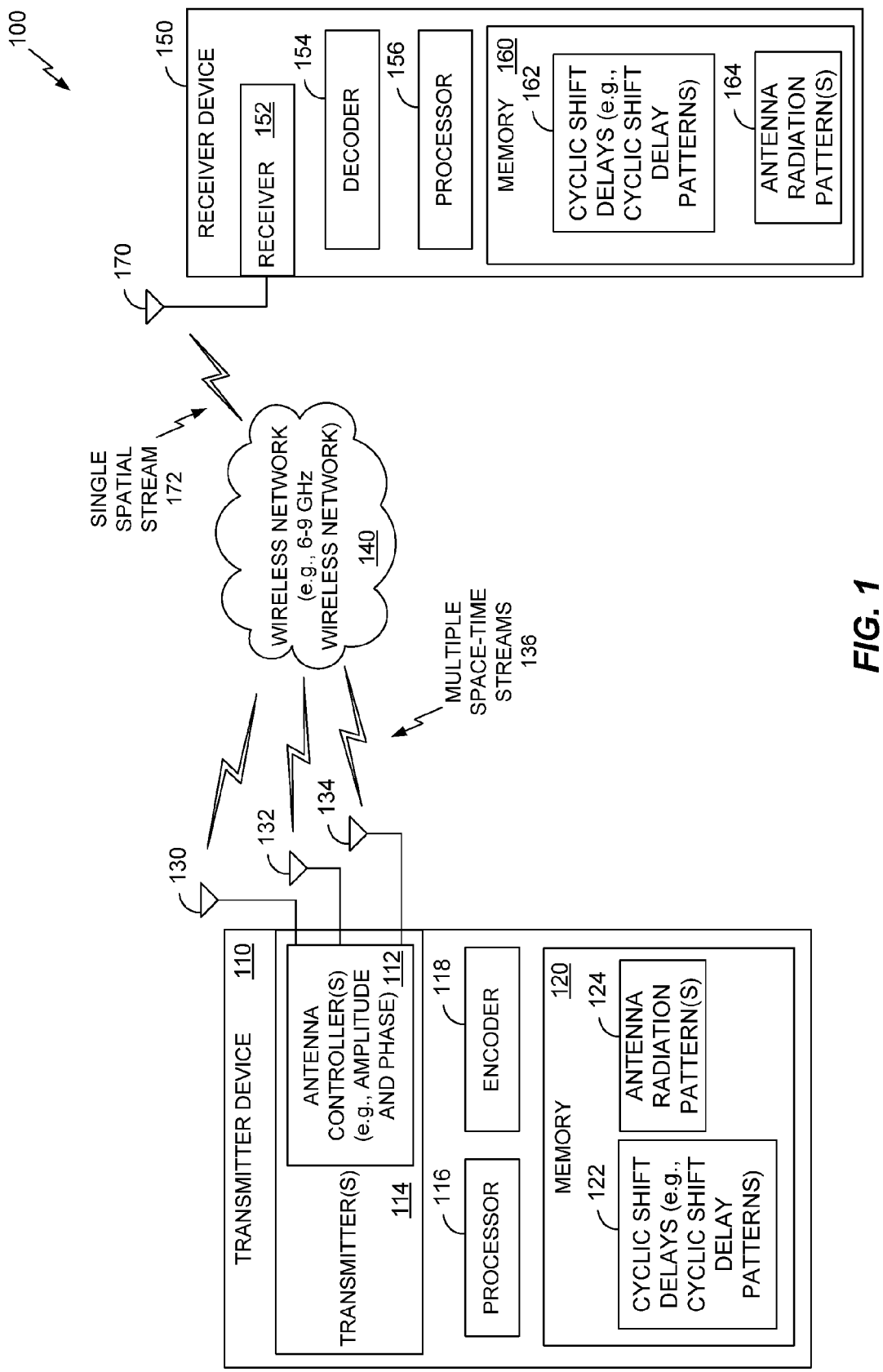
FIG. 1 is a diagram of a particular illustrative embodiment of a system configured to control an antenna radiation pattern in association with a 6-9 gigahertz (GHz) wireless network.

FIG. 1 illustrates a particular embodiment of a system 100 operable to control an antenna radiation pattern. The system 100 includes a transmitter device 110 communicably coupled to a receiver device 150 via a wireless network 140. In a particular embodiment, the wireless network 140 may be a 6-9 GHz wireless network. In another particular embodiment, the wireless network 140 may operate at a different frequency range, such as sub-1 GHz (e.g., an IEEE 802.11ah wireless network). Although FIG. 1 shows a dedicated transmitter device 110 and a dedicated receiver device 150, this is for example only. The system 100 may also support devices capable of both transmission and reception (e.g., transceivers).

The transmitter device 110 may include a processor 116 and a memory 120. The memory 120 may store data to be used in conjunction with transmission via the wireless network 140. For example, the memory 120 may store cyclic shift delays 122 and antenna radiation patterns 124. The memory 120 may also store instructions executable by the processor 116. For example, an encoder 118 may be implemented using instructions that are executable by the processor 116. Alternately, all or a portion of the encoder 118 may be implemented using hardware at the transmitter device 110. The encoder 118 may be operable to formulate message packets to be transmitted via the wireless network 140. The processor 116 may also be configured to execute an application (not shown) that initiates a signal (e.g., data) to be generated and/or transmitted.

The transmitter device 110 may also include a plurality of transmission antennas (e.g., an antenna array). For example, FIG. 1 illustrates three transmission antennas 130, 132, and 134 coupled to a transmitter 114. In alternate embodiments, more or less than three transmission antennas may be present at the transmitter device 110. In a particular embodiment, the transmitter device 110 includes four antennas.

Each of the transmission antennas 130, 132, and 134 may be associated with a corresponding space-time stream of a plurality of space-time streams 136.

The transmitter 114 may include an antenna controller 112 to control a signal processing characteristic associated with the antennas 130, 132, and 134. The signal processing techniques may control an amplitude (e.g., a magnitude) of a current applied to an antenna, a phase applied to the antenna, or a combination thereof. The signal processing may result in an application of a controlled phase per antenna, an amplitude per antenna, or a combination thereof. In a particular embodiment, phase may be varied in a non-linear manner across frequency.

Phase variation across frequency may be non-linear or linear. To achieve linear variation, signal processing techniques may be controlled in accordance with one or more cyclic shift delays (e.g., varying cyclic shift delays) that vary across tones (frequency), timeslots (time), or a combination thereof. The cyclic shift delays may be applied in a cyclical manner where delays are applied and reapplied to one or more of the antennas 130, 132, and 134. Although the antenna controller 112 is depicted as part of the transmitter 114, the antenna controller 112 may be distinct from the transmitter 114 or may be included as part of another component, such as the processor 116. The antenna controller 112 may be implemented as electronic hardware, computer software executed by a processor, or combinations of both. In a particular embodiment, phase may be varied in a non-linear manner across frequency. For example, to achieve non-linear variation of phase across frequency, a multiplier may be applied to a signal in the frequency domain prior to signal transformation (e.g., an inverse fast Fourier transform (IFFT)). After application of the IFFT, a signal having a non-linearly varied phase may be provided to one or more antennas of the antenna array. Although various descriptions herein may involve use of cyclic shift delays to linearly vary phase across frequency, such examples are for illustration only. In other embodiments, the techniques described herein may also be used in conjunction with non-linear variation of phase (e.g., using a multiplier prior to performing an IFFT), variation of amplitude, or any combination thereof to achieve a "spatially flat" antenna radiation pattern. In a particular embodiment, one or more phases of signals applied to one or more antennas of the antenna array may vary across time, frequency, or a combination thereof. Frequency may be synonymous in an orthogonal frequency-division multiplexing (OFDM) system with sub-carriers or tones.

A radiation pattern $F_{tot}(\theta, \phi)$ for an antenna array (such as an antenna array including the antennas 130, 132, and 134) may be determined based on:

$$F_{tot}(\theta,\phi)=A(\theta,\phi)F(\theta,\phi)$$

where $F(\theta, \phi)$ is a radiation pattern of a single antenna of the antenna array, $A(\theta, \phi)$ is an array factor of the antenna array, and $(\theta, \phi)$ provide an indication of complex gain in a direction where $\theta$ is an azimuth value, and $\phi$ is an elevation value. The equation for the radiation pattern $F_{tot}(\theta, \phi)$ may be divided into separate components where an azimuthal pattern is determined based on:

$$F_{tot}(\theta)=A(\theta)F(\theta),$$

and an elevation pattern is determined based on $$F_{tot}(\phi)=A(\phi)F(\phi).$$

For an antenna array having a total of N antennas placed on a line, with each antenna having a distance $d_n$ from an origin point, a current on an antenna (n) may be determined using $I_n = a_n e^{j\psi_n}$. An illustrative embodiment of an exemplary antenna array is shown with reference to FIG. 2. Accordingly, when using the azimuthal pattern, an array factor $A(\theta)$, the linear antenna array having N antennas may be determined by:

$$A(\theta) = \sum_{n=1}^{N} a_n e^{j(\psi_n + Kd_n \cos\theta)}$$

where $a_n$ is an amplitude applied in antenna (n), j is the square root of negative one ($\sqrt{-1}$), K is a wave number $$\left( K = \frac{2\pi}{\lambda} \right)$$

for a wave-length $\lambda$, $\psi$ is associated with a phase applied in antenna (n), and $\theta$ is an azimuth value. The values of a and $\psi$ for the antenna (n) may be controllable via digital signal processing (e.g., by controlling a signal processing characteristic). Additionally, $Kd_n \cos\theta$ corresponds to a phase offset of a signal from antenna (n) at a particular point in space.

For the antenna array having N antennas, an input current of the N antennas may be changed (e.g., varied) through a total of M time slots. The average array factor $A_{avg}(\theta)$ for this N element antenna array may be given by $$A_{avg}(\theta) = \frac{1}{M} \sum_{m=1}^{M} \sum_{n=1}^{N} a_{n,m} e^{j(\psi_{n,m} + Kd_n \cos\theta)}$$

$$= \sum_{n=1}^{N} e^{Kd_n \cos\theta} \frac{1}{M} \sum_{m=1}^{M} a_{n,m} e^{j\psi_{n,m}}$$

$$= \sum_{n=1}^{N} b_n e^{j(\alpha_n + Kd_n \cos\theta)}$$

where $b_n$ is an equivalent amplitude for an antenna (n) and $\alpha_n$ (alpha sub n) is an equivalent phase for the antenna (n). Accordingly, $b_n e^{j(\alpha_n)}$ may be equal to an average of $a_n e^{j(\psi_n)}$ applied over M time slots. Therefore, the average array factor $A_{avg}(\theta)$ for multiple antennas may be controlled by a magnitude of the current applied to an antenna, a phase of the current applied to the antenna, or a combination thereof. Where the average array factor $A_{avg}(\theta)$ is used, the radiation pattern $F_{tot}(\theta, \phi)$ for the antenna array may also be considered an average. For a particular number of antennas, multiple array factors may be modeled for different combinations of $b_n$ and $\alpha_n$, as illustrated with reference to FIG. 3.

For the antenna array having N antennas, an input current of the N antennas may be changed (e.g., varied) through a total of M time slots and also across P phases. The average array factor $A_{avg}(\theta)$ for this N element antenna array may be given by $$A_{avg}(\theta) = \frac{1}{P} \sum_{p=1}^{P} \frac{1}{M} \sum_{m=1}^{M} \sum_{n=1}^{N} a_{n,m,p} e^{j(\psi_{n,m,p} + Kd_n \cos\theta)}$$

Accordingly, signals may be varied across time slots (time), tones (frequencies), phase across time, phase across frequency, or a combination thereof, such that an array factor $A_{avg}(\theta)$ causes a target resultant radiation pattern over a particular number of time slots (time), tones (frequency), or a combination thereof. Stated another way, by controlling the array factor $A_{avg}(\theta)$, a target resultant radiation pattern of the antenna (or antenna array) may be achieved (e.g., a radiation pattern that complies with an EIRP limitation). In this manner, individual antenna elements having a radiation pattern which is not smooth (e.g., a high peak gain minus efficiency) may be smoothed by using varying cyclic shift delays. By applying the varying cyclic shift delays, an average of the radiation pattern $F_{tot}(\theta)$ over time for an antenna array, which is the product of the radiation pattern $F(\theta, \phi)$ of a single antenna and the effective (average) array factor $A_{avg}(\theta)$, may also have a smoother (i.e., flatter) radiation pattern with a reduced amount of peaks for the average of the radiation pattern.

The cyclic shift delays 122 for the transmitter device 110 may be determined with the purpose of generating a target resultant radiation pattern of antenna array 130, 132, and 134 that is in compliance with one or more EIRP regulations. For example, the cyclic shift delays 122 may be determined such that the transmitter device 110 has a power spectral density that is less than or equal to a threshold value. In a particular embodiment, the threshold value is −14 dBm (an abbreviation of a power ratio in decibels (dB) of a measured power referenced to one milliwatt (mW)). For example, where the transmitter device 110 operates in the 6-9 GHz frequency band, the threshold value may be −14 dBm in a 500 megahertz (MHz) bandwidth in a frequency band of interest. In a particular embodiment, the power spectral density compared to the threshold value is an average value measured during a time period. In a particular embodiment, the time period may be one millisecond (ms).

The cyclic shift delays 122 may be used to apply a different delay to each of a plurality of antennas when a single signal is transmitted via the plurality of antennas. For example, when the single signal is transmitted via two antennas, a first delay may be applied to a first antenna and a second delay may be applied to a second antenna. In a particular embodiment, the cyclic shift delays 122 may vary over time based on tones. For example, a first delay may be applied to an antenna associated with a first tone at a first time and a second delay may be applied to the antenna associated with the first tone at a second time. In another particular embodiment, the cyclic shift delays 122 may vary over a time based on time slots (time). For example, a first delay may be applied to an antenna during a first time slot and a second delay may be applied to the antenna during a second time slot.

A variation of cyclic shift delays (i.e., a cyclic shift pattern) may be determined based on a radiation pattern of an individual antenna, an array factor associated with an antenna array, or a combination thereof. The variation of cyclic shift delays used to produce a target resultant radiation pattern of an antenna array may be stored as cyclic shift delay patterns. In a particular embodiment, the cyclic shift delays 122 stored in the memory 120 include multiple cyclic delay variations that each correspond to a different cyclic shift delay pattern. Each cyclic shift delay pattern may be associated with (or selected for use based on) a corresponding number of antennas, a corresponding radiation pattern of a particular antenna, a corresponding regulatory limit (in a particular country or region), or a combination thereof. Accordingly, the transmitter device 110 may select a cyclic shift delay pattern 122 stored in the memory 120 based on a determined number of antennas to be used to transmit a signal, an identified radiation pattern of a particular antenna, an identified regulatory limit, or a combination thereof. In a particular embodiment, the processor 116 is configured to determine the number of antennas to be used, identify the radiation pattern of each antenna, identify the regulatory limit, identify a location of the transmitter device 110, or a combination thereof.

The receiver device 150 may have a single antenna 170 coupled to a receiver 152. Because the receiver device 150 includes only one antenna 170, the receiver device 150 may be considered to be capable of receiving a single spatial stream 172 via the wireless network 140. In an alternative embodiment, the receiver device 150 may include a plurality of antennas and may be configured to receive multiple spatial streams. The receiver device 150 may also include a processor 156 and a decoder 154 configured to process message packets received via the wireless network 140. A memory 160 of the receiver device 150 may store cyclic shift delays 162 and antenna radiation patterns 164, each of which may be identical to the cyclic shift delays 122 and the antenna radiation patterns 124, respectively, stored in the memory 120 of the transmitter device 110. The cyclic shift delays 122 may be defined by a wireless standard, such as an IEEE 802.11, and the antenna radiation patterns 124 may be provided by a manufacturer of a particular antenna type used by the transmitter device 110. To receive a signal (e.g., a packet) via the antenna 170, the receiver device 150 may adapt to the varying cyclic shift delays applied at the transmitter device 110. For example, the receiver device 150 may change a frequency channel on a tone-by-tone basis (e.g., across symbols) to properly receive the signal. To properly receive the signal from the transmitter device 110, the receiver device 150 may receive an indication of a number of antennas used by the transmitter device 110 to transmit the signal, a cyclic shift delay pattern used by the transmitter device 110, or a combination thereof. The indication may be included in the signal as one or more bits or may be transmitted from the transmitter device 110 to the receiver device 150 prior to a transmission of the signal.

During operation the transmitter device 110 may establish a wireless connection with the receiver device 150. For example, the transmitter device 110 (e.g., a wireless phone) may establish an ultra-wideband (UWB) connection with the receiver device 150 (e.g., a laptop computer), when the transmitter device 110 is within a close physical proximity to the receiver device 150. In a particular embodiment, close physical proximity corresponds to less than or equal to approximately 3 or 4 meters. The UWB connection may enable the transmitter device 110 and the receiver device 150 to communicate via a 6-9 GHz wireless network. In a particular embodiment, an approximate minimum bandwidth (BW) of the UWB network (e.g., a UWB system) is 500 MHz.

The transmitter device 110 may determine or select a number of antennas of an antenna array (e.g., the antennas 130, 132, and 134), and/or a cyclic shift delay pattern 122 (e.g., one or more cyclic shift delays) to be applied when transmitting data (e.g., signals) to the receiver device 150. The number of antennas and/or the cyclic shift pattern may be selected based on a corresponding regulatory limit (e.g., in a particular country or region). The cyclic shift delay pattern 122 may vary across tones (frequency), timeslots (time), or a combination thereof. The transmitter device 110 may provide an indication of the number of antennas and/or the cyclic shift pattern to be applied to the receiver device 150.

Based on the cyclic shift delay pattern 122, the antenna controller 112 of the transmitter device 110 may vary one or more signal processing characteristics to transmit a signal (e.g., a packet) to the receiver device 150 via one or more of the antennas 130, 132, and 134. For example, the antenna controller 112 may vary the signal processing characteristics, such as an amplitude (e.g., a magnitude) of a current applied to an antenna, a phase applied to the antenna, or a combination thereof. The signal may be transmitted by the transmitter device 110 and received by the receiver device 150.

During operation, the transmitter device 110 may transmit one or more signals (e.g., messages or data packets) and the receiver device 150 may receive the one or more signals in accordance with one or more varying cyclic shift delay schemes supported by the system 100 and further described with reference to FIGS. 2-5. For example, the outputs of the antennas 130, 132, and 134 may be generated by applying varying cyclic shift delays, as further described with reference to FIGS. 4-5. The system 100 may thus enable use of cyclic shift delays in conjunction with wireless transmission via multiple antennas while remaining in compliance with power requirements (e.g., EIRP regulations).

Figure 2:
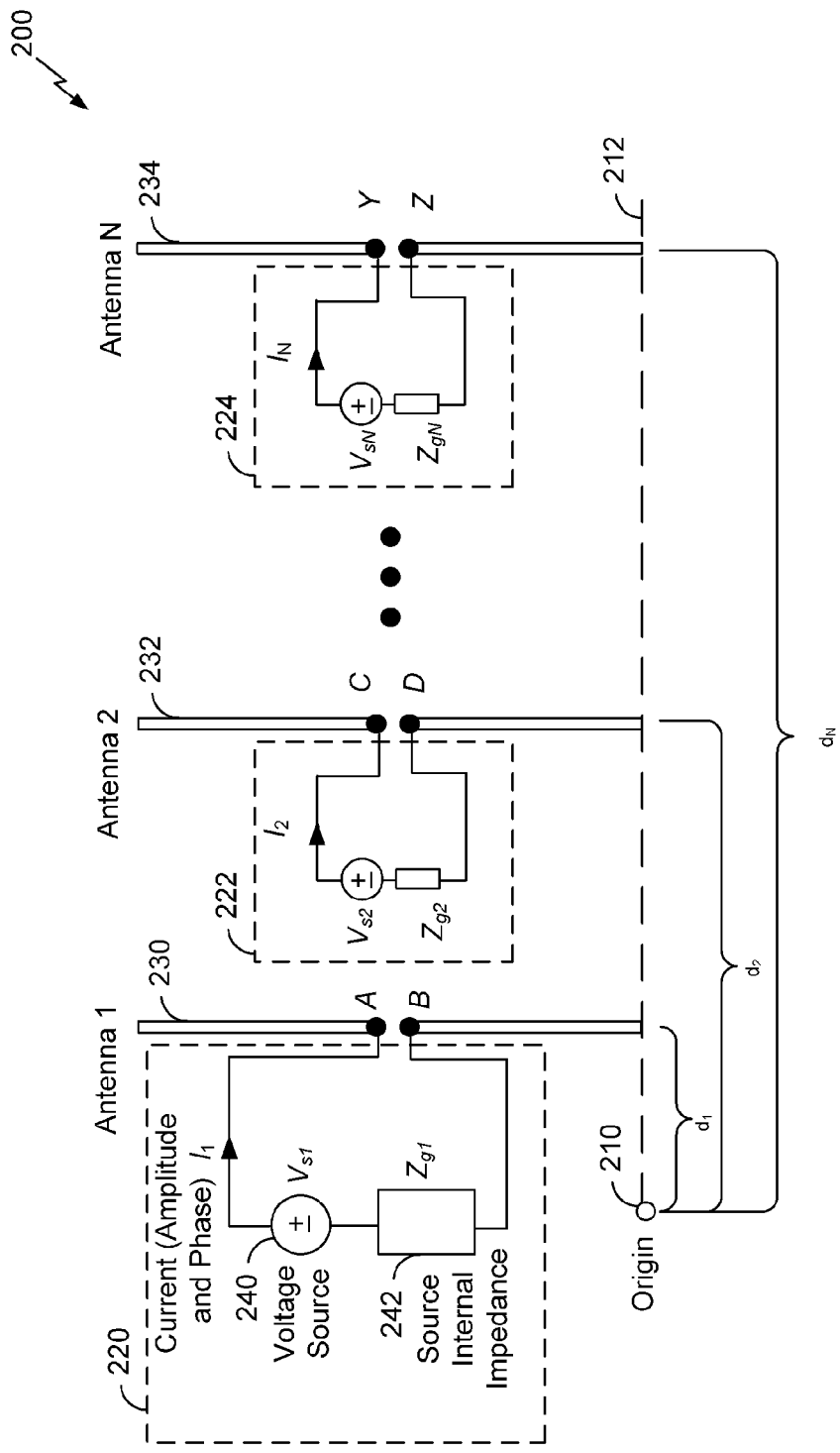
FIG. 2 is a diagram of a particular illustrative embodiment of an antenna array used in conjunction with the system of FIG. 1.

Referring to FIG. 2, a particular embodiment of an antenna array 200 operable to use varying cyclic shift delays is shown. In a particular embodiment, the antenna array 200 may include the antennas 130, 132, and 134 of the transmitter device 110 or the antenna 170 of the receiver device 150 of FIG. 1.

The antenna array 200 may include a plurality of antennas, such as a first antenna 230, a second antenna 232, and an $N^{th}$ antenna 234. Although three antennas are illustrated in the antenna array 200 of FIG. 2, more than or fewer than three transmission antennas may be included in the antenna array 200. The antennas 230, 232, and 234 may each be positioned along a line 212. Each set of consecutive antennas may be equally spaced along the line 212. Each antenna may also be spaced from an origin point 210 as indicated by distances $d_1$-$d_N$. The origin point 210 may be an arbitrary point located on the line 212 or at any other location.

Each antenna 230, 232, and 234 may be associated with a corresponding radiation pattern. In a particular embodiment, the radiation pattern of each of the antennas 230, 232, and 234 is substantially the same. As explained with reference to FIG. 1, for a plurality of N antennas (e.g., the plurality of antennas 230, 232, and 234) that are placed on a line (e.g., the line 212) with distance $d_n$ (e.g., $d_1$-$d_N$) from an origin (e.g., the origin point 210), the current on an antenna n is $I_n = a_n e^{j\psi_n}$, and an array factor is given by:

$$A(\theta) = \Sigma_{n=1}^{N} a_n e^{j(\psi_n + K d_n \cos \theta)}$$

where a is an amplitude applied in antenna (n), j is the square root of negative one ($\sqrt{-1}$), K is a wave number $$\left( K = \frac{2\pi}{\lambda} \right)$$

for a wave-length $\lambda$, $\psi$ is associated with a phase applied in antenna (n), and $\theta$ is an azimuth value.

Each antenna of the plurality of antennas 230, 232, and 234 may have a corresponding antenna controller 220-224, respectively. The antenna controllers 220-224 may each be constructed such that each antenna controller 220-240 provides similar functionality to control an operation of a corresponding antenna. For example, a first antenna controller 220 of the first antenna 230 may be functionally similar to and therefore representative of a second antenna controller 222 of the second antenna 232, and an $N^{th}$ antenna controller 224 of the $N^{th}$ antenna 234.

The first antenna controller 220 may be coupled to the first antenna 230 at connection points A and B. The first antenna controller 220 may include a voltage source 240 ($V_{s1}$) and source internal impedance 242 ($Z_{g1}$). The first antenna controller 220 may be configured to control a current $I_1$ provided to the first antenna 230. For example, the first antenna controller 220 may control an amplitude (i.e., a magnitude) of the current $I_1$, a phase of the current $I_1$, or a combination thereof. In a particular embodiment, the first antenna controller 220 may control the current $I_1$ based on varying cyclic shift delays to enable a radiation pattern of the antenna array 200 to be sufficiently smooth. For example, the cyclic shift delays may include the cyclic shift delays 122 and 162 of FIG. 1. The first antenna controller 220 may adjust a voltage of the voltage source 240 and/or an impedance of the source internal impedance 242 to control the current $I_1$ in accordance with the varying cyclic shift delays (i.e., a cyclic shift pattern). Each of the antenna controllers 222 and 224 may operate in a similar manner as the first antenna controller 220.

Accordingly, the system 200 of FIG. 2 may enable use of varying cyclic shift delays in conjunction with wireless transmission via multiple antennas while remaining in compliance with power requirements (e.g., EIRP regulations).

Figure 3:
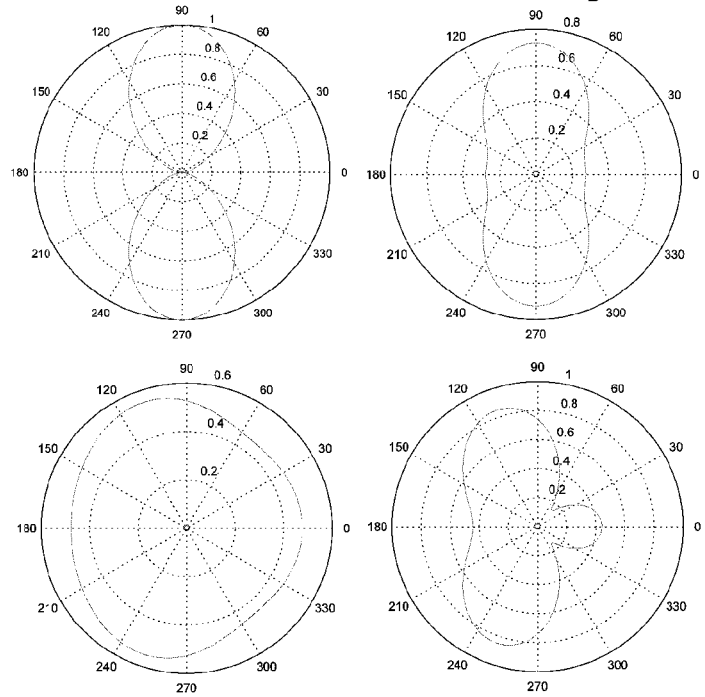
FIG. 3 depicts graphs illustrating particular embodiments of array factors for multi-antenna arrays.
Figure 3:
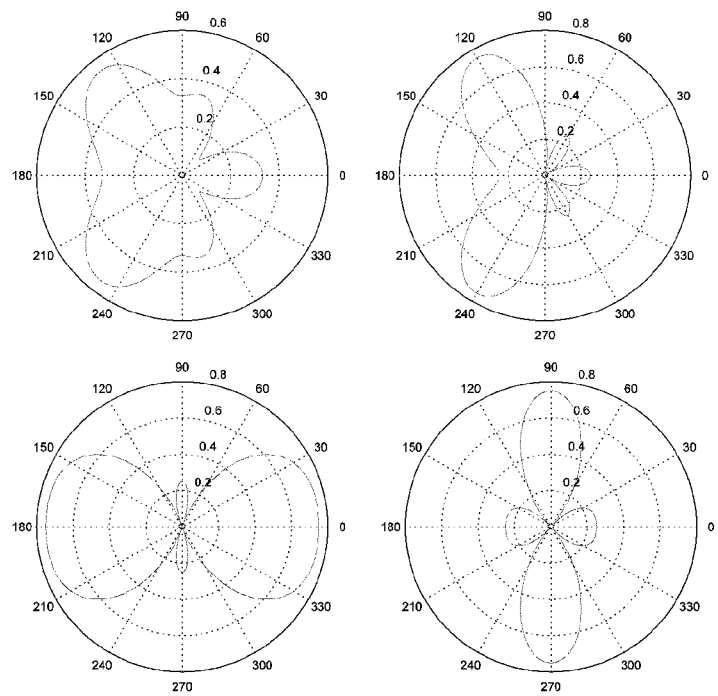

Referring to FIG. 3, graphs 300 show multiple array factors for a two antenna array and graphs 320 show multiple array factors for a three antenna array.

Each set of graphs 300 and 320 show different shapes of array factors that may be achieved based on:

$$A_{avg}(\theta) = \Sigma_{n=1}^{N} b_n e^{j(\alpha_n + Kd_n \cos \theta)}$$

where the values of $b_n$ and $\alpha_n$ are varied. For example, each sub-graph of the graphs 300 shows an array factor for corresponding values of $b_n$ and $\alpha_n$. As can be seen from the sets of graphs 300, 320, a shape of the array factor may be changed by varying $b_n$ and $\alpha_n$. Therefore, given a radiation pattern provided by a manufacture of a particular antenna, the array factor may be selected such that a product of the radiation pattern for the particular antenna and the array factor produces a target resultant radiation pattern for an antenna array that has a desired shape (e.g., a target resultant radiation pattern that is substantially smooth).

Figure 4:
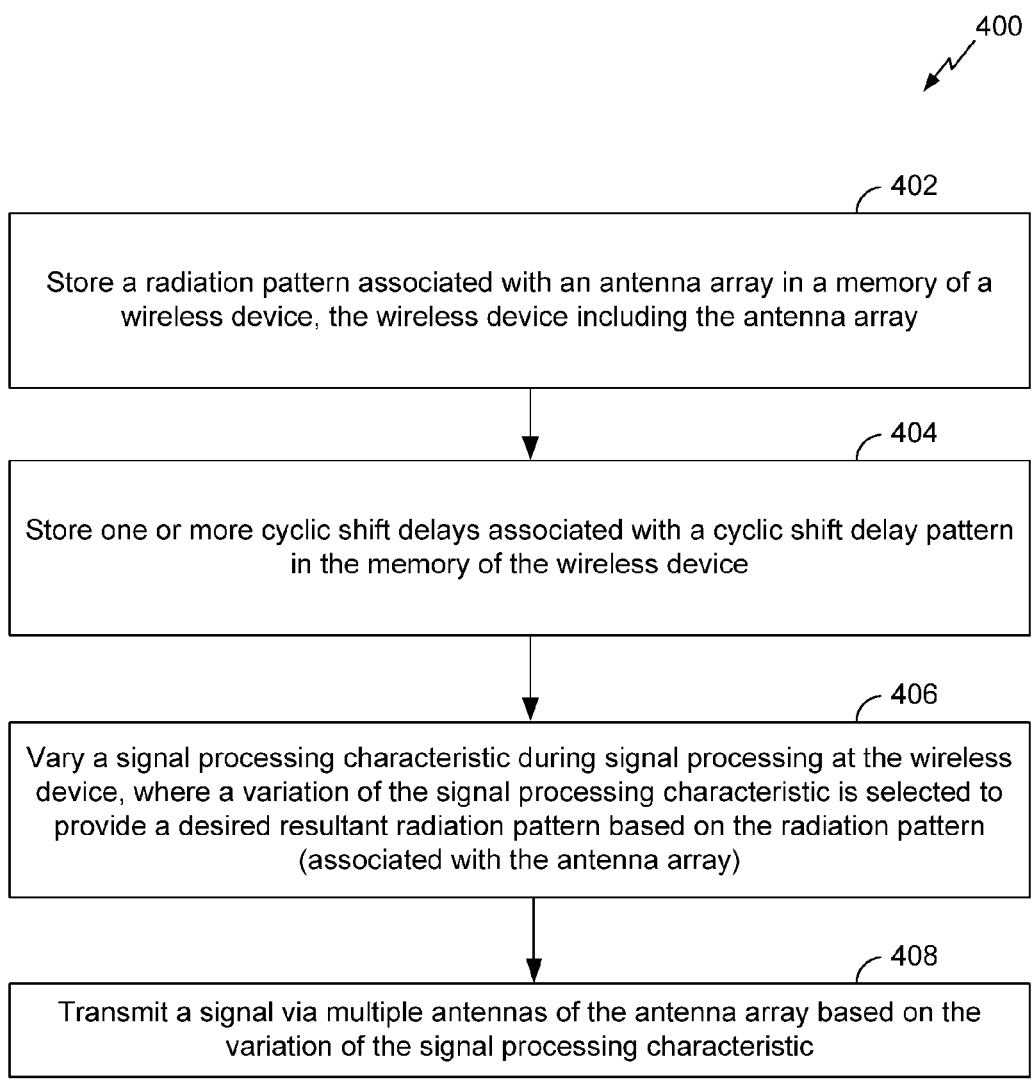
FIG. 4 is a flow diagram of a first illustrative embodiment of a method of controlling an antenna radiation pattern.

FIG. 4 is a flow diagram of a first illustrative embodiment of a method 400 of varying an antenna radiation pattern (e.g., using cyclic shift delays). In a particular embodiment, the method 400 may be performed by the transmitter device 110 of FIG. 1. The wireless device may operate in a 6-9 gigahertz (GHz) wireless network. In a particular embodiment, the 6-9 gigahertz (GHz) wireless network is an Institute of Electrical and Electronics Engineers (IEEE) compliant wireless network.

A radiation pattern associated with an antenna array may be stored in a memory of a wireless device, where the wireless device includes the antenna array, at 402. One or more cyclic shift delays associated with a cyclic shift delay pattern may be stored in the memory of the wireless device, at 404. In a particular embodiment, the radiation pattern corresponds to a single antenna of the antenna array. The radiation pattern of the single antenna may be provided by a manufacturer of the single antenna. For example, the radiation pattern stored in the memory may include the antenna radiation pattern 124 stored in the memory 120 or the radiation pattern 164 stored in the memory 160 of FIG. 1.

A signal processing characteristic is varied during signal processing at the wireless device, where a variation of the signal processing characteristic is selected to provide a target resultant radiation pattern based on the radiation pattern, at 406. For example, the signal processing characteristic may be varied by the antenna controller 112 of FIG. 1 or the antenna controllers 220-224 of FIG. 2. In a particular embodiment, the signal processing characteristic is associated with a phase per antenna. For example, the signal processing characteristic may be varied using cyclic shift delays. The cyclic shift delays may vary the signal processing characteristics across time slots (time), tones (frequency), or a combination thereof. As another example, the phase may be varied in a non-linear manner across frequency. The signal processing characteristic may be associated with a current applied to each of a plurality of antennas of the antenna array. For example, the signal processing may control an amplitude, a phase, or a combination thereof.

A signal may be transmitted via multiple antennas of the antenna array based on the variation of the signal processing characteristic, at 408. For example, the multiple antennas of the antenna array may include the antennas 130, 132, and 134, 170 of FIG. 1 or the antennas 230, 232, and 234 of FIG. 2. A target resultant radiation pattern of the antenna array may be substantially spatially smooth (i.e., substantially flat).

Figure 5:
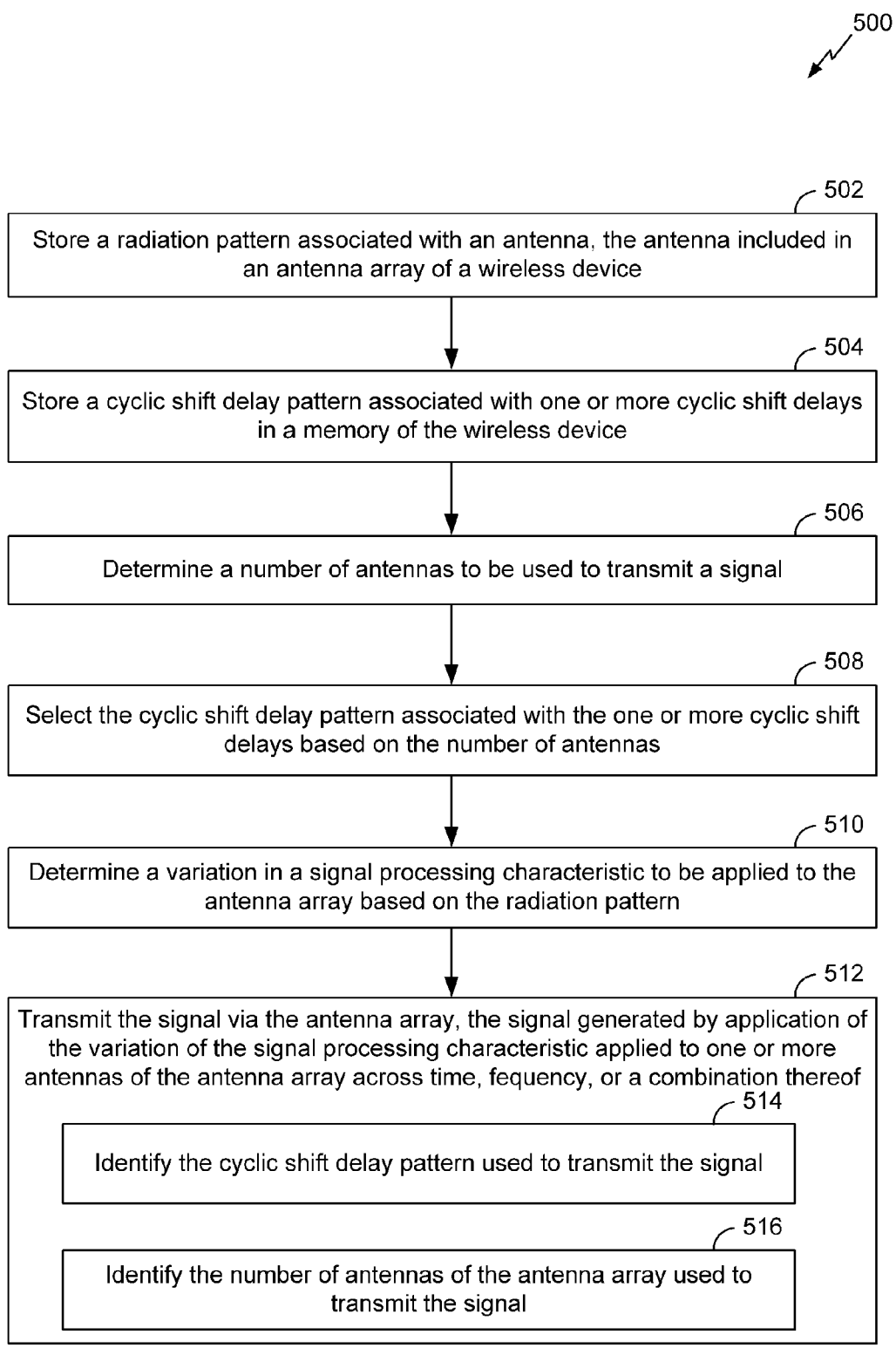
FIG. 5 is a flow diagram of a second illustrative embodiment of a method of controlling an antenna radiation pattern.

FIG. 5 is a flow diagram of a second illustrative embodiment of a method 500 of varying an antenna radiation pattern (e.g., using cyclic shift delays). For example, the method 500 may be implemented by the transmitter device 110 of FIG. 1.

A radiation pattern associated with an antenna is stored at 502. The antenna is included in an antenna array of a wireless device. In a particular embodiment, the antenna array includes multiple antennas. For example, the radiation pattern may include the antenna radiation pattern 124 and the antenna radiation pattern 164 of FIG. 1.

A cyclic shift delay pattern associated with one or more cyclic shift delays may be stored in a memory of the wireless device, at 504. For example, the cyclic shift delay pattern may include the cyclic shift delays 122 and the cyclic shift delays 162 of FIG. 1.

A number of antennas to be used to transmit a signal may be determined, at 506, and the cyclic shift delay pattern associated with the one or more cyclic shift delays may be selected based on the number of antennas, at 508. The number of antennas to be used to transmit the signal may be controlled by an application of the wireless device responsible for generating the signal. In a particular embodiment, the number of antennas to be used is less than a total number of antennas in the antenna array of the wireless device. The number of antennas may be used to select a stored cyclic shift delay pattern that corresponds to the number of antennas. For example, the processor 116 of FIG. 1 may determine a number of antennas to be used to transmit the signal.

A variation in a signal processing characteristic to be applied to the antenna array based on the radiation pattern may be determined at 510. For example, the processor 116 of FIG. 1 may determine the one or more cyclic shift delays to be applied to the antenna array. The signal processing may result in an application of a phase per antenna, an amplitude per antenna, or a combination thereof. In a particular embodiment, phase may be varied in a non-linear manner across frequency. The signal processing characteristic may be varied across time slots (time), tones (frequency), or a combination thereof. In a particular embodiment, the single processing characteristic is associated with a phase per antenna, where the phase is varied in a non-linear manner across frequency. The target resultant radiation pattern includes an average value over a time period that complies with an EIRP limitation. In another particular embodiment, the signal processing characteristic is varied using cyclic shift delays. The cyclic shift delays may enable an amplitude, a phase, or any combination thereof, of a current applied to each of a plurality of antennas of a wireless device, to vary across tones (frequency), time slots (time), or a combination thereof.

The signal may be transmitted via the antenna array, the signal generated by application of the signal processing characteristic applied to one or more antennas of the antenna array across time, frequency, or a combination thereof, at 512. For example, one or more phases applied to one or more antennas of the antenna array may vary across time, frequency, or a combination thereof. In a particular embodiment, the one or more phases applied to the one or more antennas is varied across time and frequency. Frequency may be synonymous in an orthogonal frequency-division multiplexing (OFDM) system with sub-carriers or tones.

Transmitting the signal may further include transmitting data identifying the cyclic shift delay pattern used to transmit the signal, at 514, and transmitting data identifying the number of antennas of the antenna array used to transmit the signal, at 516. For example, the antenna array may include the antennas 130, 132, and 134 and the antenna 170 of FIG. 1 or the antennas 230, 232, and 234 of FIG. 2. The cyclic shift delay pattern and/or the number of antennas may be provided to a receiving device to enable the receiving device to properly receive the transmitted signal.

In a particular embodiment, a power spectral density associated with a transmission of the signal may be less than approximately −14.3 dBm in a 500 megahertz (MHz) bandwidth. For example, the 500 MHz bandwidth is included in a 6-9 gigahertz (GHz) wireless network.

In another particular embodiment, an equivalent isotopic radiation power (EIRP) value of the wireless device across multiple symbols over a time period is less than a threshold value. For example, the time period is approximately one millisecond and the threshold value is approximately −14.3 dBm.

The methods of FIGS. 4 and 5 may thus enable use of varying cyclic shift delays in conjunction with wireless transmission via multiple antennas while remaining in compliance with power requirements (e.g., EIRP regulations).

The methods of FIGS. 4-5 may be implemented by a field-programmable gate array (FPGA) device, an application-specific integrated circuit (ASIC), a processing unit such as a central processing unit (CPU), a digital signal processor (DSP), a controller, another hardware device, a firmware device, or any combination thereof. As an example, the methods of FIGS. 4-5, or certain elements of the methods 400, or 500 can be performed by one or more processors that execute instructions, as described with reference to FIG. 6.

Figure 6:
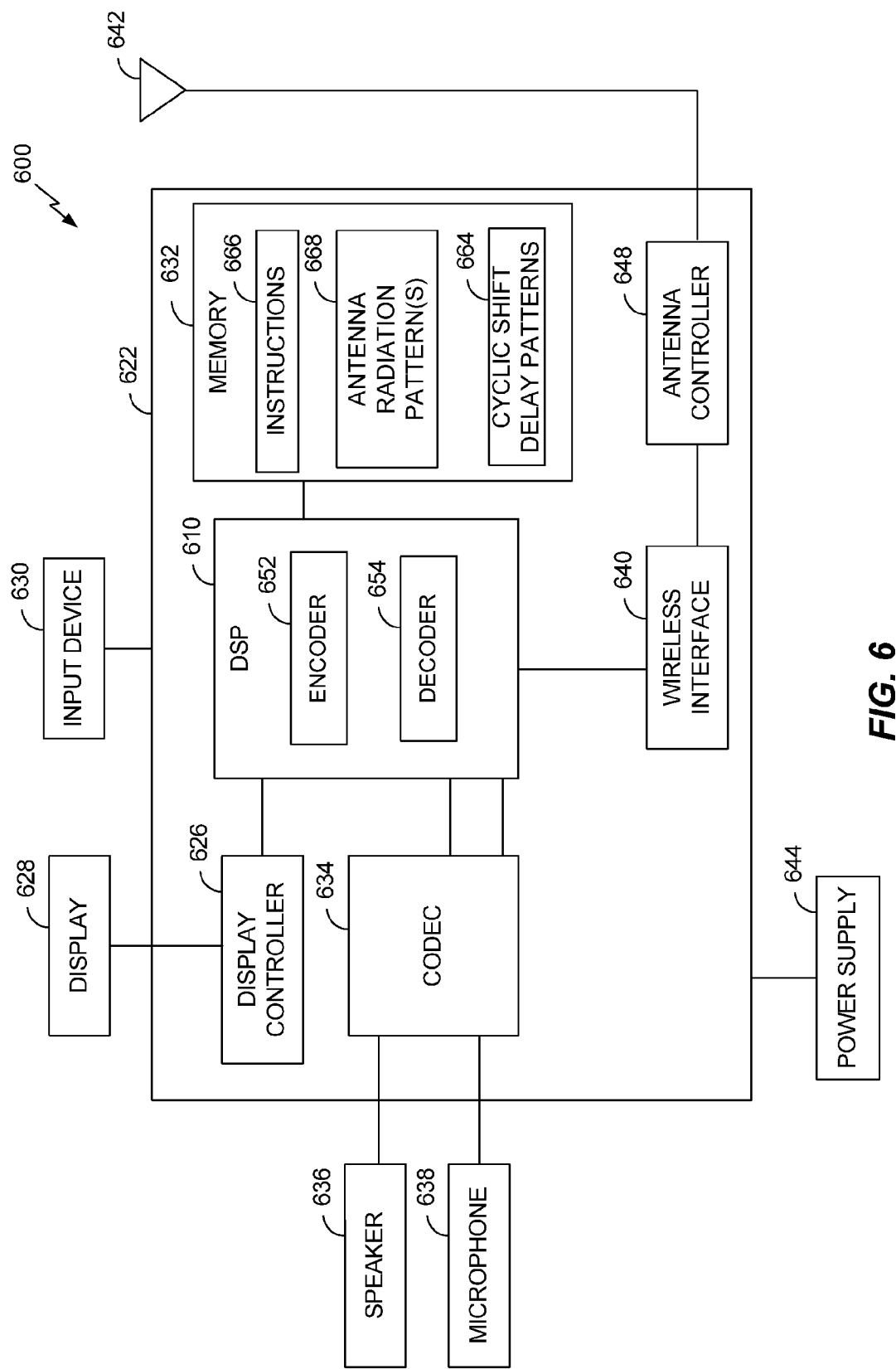
FIG. 6 is a block diagram of a device including a mobile device operable to perform signal processing operations to control an antenna radiation pattern.

Referring to FIG. 6, a block diagram of a particular illustrative embodiment of a wireless communication device is depicted and generally designated 600. The device 600 includes a processor, such as a digital signal processor (DSP) 610, coupled to a memory 632. The DSP 610 may include or implement an encoder 652 and a decoder 654. For example, the encoder 652 and the decoder 654 may include the encoder 118 and the decoder 154 of FIG. 1, respectively.

In a particular embodiment, the memory 632 includes instructions 666 (e.g., executable instructions) such as computer-readable instructions or processor-readable instructions. The instructions 666 may include one or more instructions that are executable by a computer or processor such as the DSP 610. The memory 632 may also include antenna radiation pattern(s) 668 and cyclic shift delay patterns 664. For example, the cyclic shift delay patterns 664 may include the cyclic shift delays 122 and the cyclic shift delays 162 of FIG. 1, and the antenna radiation pattern(s) 668 may include the antenna radiation patterns 124 and the antenna radiation patterns 164 of FIG. 1.

FIG. 6 also shows a display controller 626 that is coupled to the digital signal processor 610 and to a display 628. A coder/decoder (CODEC) 634 can also be coupled to the digital signal processor 610. A speaker 636 and a microphone 638 can be coupled to the CODEC 634.

FIG. 6 also indicates that a wireless interface 640 and an antenna controller 648. The wireless interface 640 may be coupled to the digital signal processor 610 and coupled to a wireless antenna 642 via the antenna controller 648. The wireless antenna 642 may be included in an antenna array, such as the antennas 130, 132, and 134, or the antenna 170 of FIG. 1 or the antenna array 200 of FIG. 2. The antenna controller 648 may include the antenna controller 112 of FIG. 1 or the antenna controllers 220-224 of FIG. 2.

In a particular embodiment, the DSP 610, the display controller 626, the memory 632, the CODEC 634, the wireless interface 640, and the antenna controller 648 are included in a system-in-package or system-on-chip device 622. In a particular embodiment, an input device 630 and a power supply 644 are coupled to the system-on-chip device 622. Moreover, in a particular embodiment, as illustrated in FIG. 6, the display 628, the input device 630, the speaker 636, the microphone 638, the wireless antenna 642, and the power supply 644 are external to the system-on-chip device 622. However, each of the display 628, the input device 630, the speaker 636, the microphone 638, the wireless antenna 642, and the power supply 644 can be coupled to a component of the system-on-chip device 622, such as an interface or a controller.

The processor 610 may be configured to execute computer executable instructions 666 stored at a non-transitory computer-readable medium, such as the memory 632, that are executable to cause a computer, such as the processor 610, to vary a signal processing characteristic during signal processing at a wireless device including an antenna array. A variation of the signal processing characteristic is based on a radiation pattern associated with the antenna array.

The processor 610 may be configured to execute computer executable instructions 666 stored at a non-transitory computer-readable medium, such as the memory 632, that are executable to cause a computer, such as the processor 610, to store a radiation pattern associated with an antenna, where the antenna is included in an antenna array of a wireless device. The computer executable instructions 666 are further executable to cause the processor 610 to determine one or more cyclic shift delays to be applied to the antenna array based on the radiation pattern. The computer executable instructions 666 are further executable to cause the processor 610 to initiate a transmission of a signal via the antenna array using the one or more cyclic shift delays.

Figure 7:
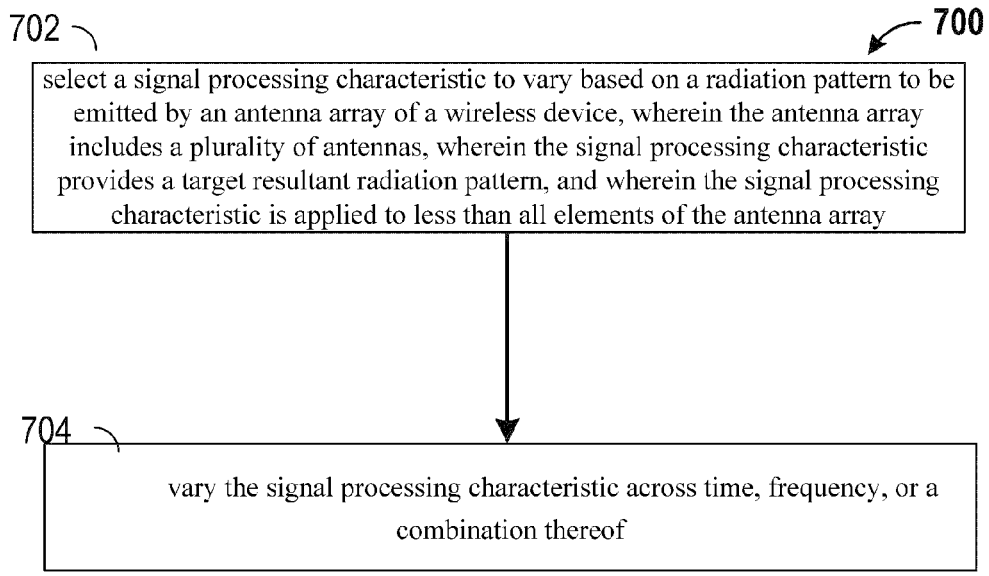
FIG. 7 is a flowchart of an exemplary method of controlling a radiation pattern emitted by an antenna array of a wireless device.

FIG. 7 is a flowchart 700 of an exemplary method of controlling a radiation pattern emitted by an antenna array of a wireless device. In an embodiment, the steps in flowchart 700 may be performed by a processor, e.g., the processor 116 (FIG. 1) in conjunction with the memory 120 (FIG. 1). Although the method of flowchart 700 is described herein with reference to a particular order, in various embodiments, blocks herein may be performed in a different order, omitted, and/or additional blocks may be added.

First, at block 702, the antenna controller (e.g., 112 in FIG. 1) selects a signal processing characteristic to vary based on a radiation pattern to be emitted by an antenna array, such as the array 130, 132, and 134 in FIG. 1, of a wireless device (e.g., 110 in FIG. 1). The signal processing characteristic provides a target resultant radiation pattern. Second, at block 704, the signal processing characteristic is varied across time, frequency, or a combination thereof.

Figure 8:
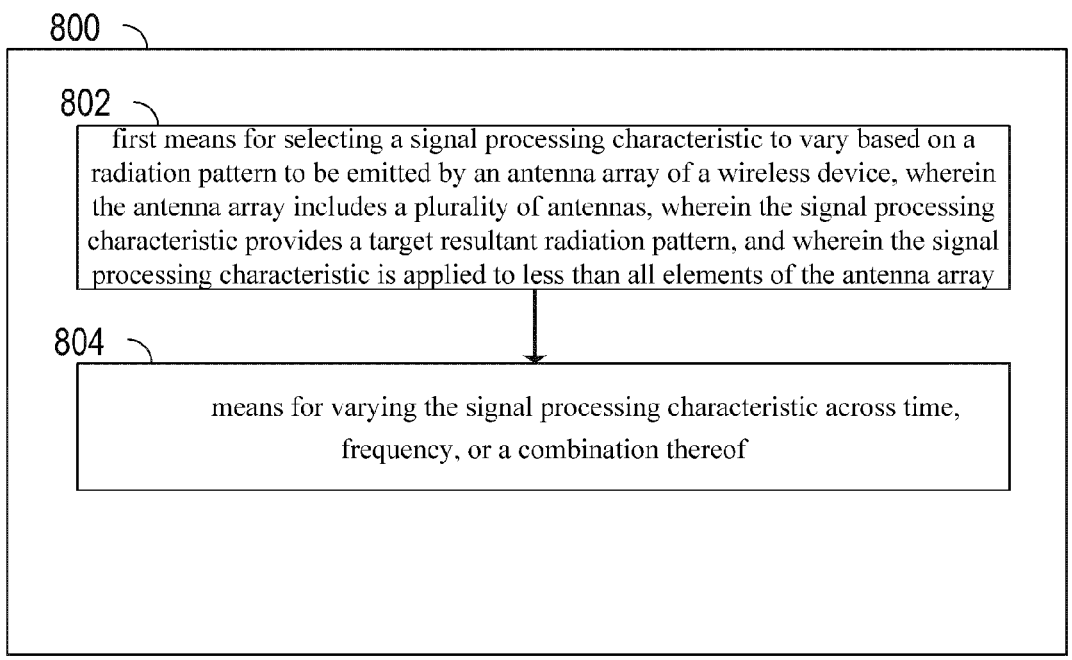
FIG. 8 is a functional block diagram of an apparatus for controlling a radiation pattern emitted by an antenna array of a wireless device, in accordance with an exemplary embodiment of the invention.

FIG. 8 is a functional block diagram of an apparatus 800 for controlling a radiation pattern emitted by an antenna array of a wireless device, in accordance with an exemplary embodiment of the invention. The apparatus 800 includes only those components useful for describing some prominent features of implementations within the scope of the claims.

In an embodiment, the first means 802 for selecting a signal processing characteristic to vary based on a radiation pattern to be emitted by an antenna array of a wireless device, wherein the signal processing characteristic provides a target resultant radiation pattern, can be configured to perform one or more of the functions described above with respect to block 702 (FIG. 7).

In an embodiment, the means 804 for varying the signal processing characteristic across time, frequency, or a combination thereof, can be configured to perform one or more of the functions described above with respect to block 704 (FIG. 7).

One or more of the disclosed embodiments may be implemented in a system or an apparatus, such as the device 600, that may include a set top box, an entertainment unit, a navigation device, a communications device, a personal digital assistant (PDA), a fixed location data unit, a mobile location data unit, a mobile phone, a cellular phone, a computer, a portable computer, a desktop computer, a monitor, a computer monitor, a television, a tuner, a radio, a satellite radio, a music player, a digital music player, a portable music player, a video player, a digital video player, a digital video disc (DVD) player, a portable digital video player, or a combination thereof. As another illustrative, non-limiting example, the system or the apparatus may include remote units, such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof. Although one or more of FIGS. 1-8 may illustrate systems, apparatuses, and/or methods according to the teachings of the disclosure, the disclosure is not limited to these illustrated systems, apparatuses, and/or methods. Embodiments of the disclosure may be suitably employed in any device that includes integrated circuitry including memory and on-chip circuitry.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The methods or algorithms described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method of providing a radiation pattern, the method comprising:
   selecting a signal processing characteristic to vary based on a radiation pattern to be emitted by an antenna array of a wireless device, the radiation pattern having a first number of peaks, wherein the antenna array includes a plurality of antenna elements, wherein varying the signal processing characteristic provides a target resultant radiation pattern to be emitted by the antenna array, the target resultant radiation pattern having a second number of peaks, the second number of peaks being less than the first number of peaks, and wherein the signal processing characteristic is applied to at least one of the plurality of antenna elements of the antenna array; and
   varying the signal processing characteristic across time, frequency, or a combination thereof.

2. The method of claim 1, wherein the signal processing characteristic is applied to less than all of the plurality of antenna elements of the antenna array based on a determination by a processor, a corresponding regulatory limit, or a combination thereof.

3. The method of claim 1, wherein the signal processing characteristic is associated with a phase per antenna, and wherein the phase is varied in a non-linear manner across frequency.

4. The method of claim 1, wherein the signal processing characteristic is associated with a phase per antenna, and wherein the phase is varied using cyclic shift delays.

5. The method of claim 4, further comprising determining the cyclic shift delays based on a power spectral density value associated with a transmission of the signal being less than or equal to a threshold power spectral density value.

6. The method of claim 5, further comprising storing one or more of the cyclic shift delays in a memory of the wireless device.

7. The method of claim 1, wherein the signal processing characteristic is based on a magnitude or amplitude of an electrically supplied current applied to each of the plurality of antenna elements.

8. The method of claim 7, further comprising transmitting a signal via the plurality of antenna elements of the antenna array based on varying the signal processing characteristic.

9. The method of claim 1, wherein the wireless device operates in a 6-9 gigahertz (GHz) wireless network.

10. The method of claim 1, wherein a power spectral density value associated with a transmission of the wireless device is less than approximately −14.3 dBm in a 500 megahertz (MHz) bandwidth.

11. The method of claim 1, wherein an equivalent isotropic radiation power (EIRP) value of the wireless device across multiple symbols over a time period is less than a threshold value, thereby producing a substantially smooth radiation pattern.

12. An apparatus configured to provide a radiation pattern, comprising:
an antenna array including a plurality of antenna elements; and
a processor, the processor being configured to:
select a signal processing characteristic to vary based on a radiation pattern to be emitted by the antenna array, the radiation pattern having a first number of peaks, wherein varying the signal processing characteristic provides a target resultant radiation pattern to be emitted by the antenna array, the target resultant radiation pattern having a second number of peaks, the second number of peaks being less than the first number of peaks, and wherein the signal processing characteristic is applied to at least one of the plurality of antenna elements of the antenna array; and
vary the signal processing characteristic across time, frequency, or a combination thereof.

13. The apparatus of claim 12, wherein the signal processing characteristic is applied to less than all of the plurality of antenna elements of the antenna array based on a determination by the processor, a corresponding regulatory limit, or a combination thereof.

14. The apparatus of claim 12, wherein the signal processing characteristic is associated with a phase per antenna, and wherein the phase is varied in a non-linear manner across frequency.

15. The apparatus of claim 12, wherein the signal processing characteristic is associated with a phase per antenna, and wherein the phase is varied using cyclic shift delays.

16. The apparatus of claim 15, wherein the processor is further configured to determine the cyclic shift delays based on a power spectral density value associated with a transmission of the apparatus being less than or equal to a threshold power spectral density value.

17. The apparatus of claim 16, wherein the processor is further configured to store one or more of the cyclic shift delays in a memory of the apparatus.

18. The apparatus of claim 12, wherein the signal processing characteristic is based on a magnitude or amplitude of an electrically supplied current applied to each of the plurality of antenna elements.

19. The apparatus of claim 18, wherein the processor is further configured to transmit a signal via the plurality of antenna elements of the antenna array based on varying the signal processing characteristic.

20. The apparatus of claim 12, wherein the apparatus operates in a 6-9 gigahertz (GHz) wireless network.

21. The apparatus of claim 12, wherein a power spectral density value associated with a transmission of the apparatus is less than approximately −14.3 dBm in a 500 megahertz (MHz) bandwidth.

22. The apparatus of claim 12, wherein an equivalent isotropic radiation power (EIRP) value of the apparatus across multiple symbols over a time period is less than a threshold value, thereby producing a substantially smooth radiation pattern.

23. An apparatus for providing a radiation pattern, comprising:
first means for selecting a signal processing characteristic to vary based on a radiation pattern to be emitted by an antenna array of the apparatus, the radiation pattern having a first number of peaks, wherein the antenna array includes a plurality of antenna elements, wherein varying the signal processing characteristic provides a target resultant radiation pattern to be emitted by the antenna array, the target resultant radiation pattern having a second number of peaks, the second number of peaks being less than the first number of peaks, and wherein the signal processing characteristic is applied to at least one of the plurality of antenna elements of the antenna array; and
means for varying the signal processing characteristic across time, frequency, or a combination thereof.

24. The apparatus of claim 23, wherein the signal processing characteristic is applied to less than all of the plurality of antenna elements of the antenna array are selected based on a determination by the first means for selecting, a corresponding regulatory limit, or a combination thereof.

25. The apparatus of claim 23, wherein the signal processing characteristic is associated with a phase per antenna, and wherein the phase is varied in a non-linear manner across frequency.

26. The apparatus of claim 23, wherein the signal processing characteristic is associated with a phase per antenna, and wherein the phase is varied using cyclic shift delays.

27. The apparatus of claim 26, further comprising means for determining the cyclic shift delays based on a power spectral density value associated with a transmission of the signal being less than or equal to a threshold power spectral density value.

28. The apparatus of claim 27, further comprising means for storing one or more of the cyclic shift delays in a memory of the apparatus.

29. The apparatus of claim 23, wherein the signal processing characteristic is based on a magnitude or amplitude of an electrically supplied current applied to each of the plurality of antenna elements.

30. The apparatus of claim 29, further comprising means for transmitting a signal via the plurality of antenna elements of the antenna array based on varying the signal processing characteristic.

31. The apparatus of claim 23, wherein the apparatus operates in a 6-9 gigahertz (GHz) wireless network.

32. The apparatus of claim 23, wherein a power spectral density value associated with a transmission of the apparatus is less than approximately −14.3 dBm in a 500 megahertz (MHz) bandwidth.

33. The apparatus of claim 23, wherein an equivalent isotropic radiation power (EIRP) value of the apparatus across multiple symbols over a time period is less than a threshold value, thereby producing a substantially smooth radiation pattern.

34. A non-transitory computer-readable medium comprising code that, when executed, causes an apparatus to:
  select a signal processing characteristic to vary based on a radiation pattern to be emitted by an antenna array of the apparatus, the radiation pattern having a first number of peaks, wherein the antenna array includes a plurality of antenna elements, wherein varying the signal processing characteristic provides a target resultant radiation pattern to be emitted by the antenna array, the target resultant radiation pattern having a second number of peaks, the second number of peaks being less than the first number of peaks, and wherein the signal processing characteristic is applied to at least one of the plurality of antenna elements of the antenna array; and
  vary the signal processing characteristic across time, frequency, or a combination thereof.

35. The medium of claim 34, wherein the signal processing characteristic is applied to less than all of the plurality of antenna elements of the antenna array are selected based on a determination by a processor, a corresponding regulatory limit, or a combination thereof.

36. The medium of claim 34, wherein the signal processing characteristic is associated with a phase per antenna, and wherein the phase is varied in a non-linear manner across frequency.

37. The medium of claim 34, wherein the signal processing characteristic is associated with a phase per antenna, and wherein the phase is varied using cyclic shift delays.

38. The medium of claim 37, further comprising code that, when executed, causes the apparatus to determine the cyclic shift delays based on a power spectral density value associated with a transmission of the signal being less than or equal to a threshold power spectral density value.

39. The medium of claim 38, further comprising code that, when executed, causes the apparatus to store one or more of the cyclic shift delays in a memory of the apparatus.

40. The medium of claim 34, wherein the signal processing characteristic is based on a magnitude or amplitude of an electrically supplied current applied to each of the plurality of antenna elements.

41. The medium of claim 40, further comprising code that, when executed, causes the apparatus to transmit a signal via the plurality of antenna elements of the antenna array based on varying the signal processing characteristic.

42. The medium of claim 34, wherein the apparatus operates in a 6-9 gigahertz (GHz) wireless network.

43. The medium of claim 34, wherein a power spectral density value associated with a transmission of the apparatus is less than approximately −14.3 dBm in a 500 megahertz (MHz) bandwidth.

44. The medium of claim 34, wherein an equivalent isotropic radiation power (EIRP) value of the apparatus across multiple symbols over a time period is less than a threshold value, thereby producing a substantially smooth radiation pattern.

* * * * *